United States Patent Office 3,321,442
Patented May 23, 1967

3,321,442
PROCESS FOR PREPARING KETENE POLYMERS EMPLOYING PALLADIUM CATALYSTS
Hermann Beecken, Bonn, Ernest Willi Müller, Saint Augustin, and Friedrich W. A. G. K. Korte, Hangelar, Germany, assignors to Shell Oil Company, New York, N.Y., a corporation of Delaware
No Drawing. Filed Sept. 20, 1963, Ser. No. 310,495
Claims priority, application Germany, Oct. 9, 1962, S 81,967
5 Claims. (Cl. 260—63)

This invention relates to the preparation of ketene polymers. More particularly, the invention relates to a process for the preparation of polymeric ketenes having a polyester structure of the following type:

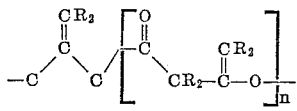

wherein R represents an organic radical, preferably a hydrocarbon radical, and/or hydrogen and $n$ is a positive integer.

Specifically, the invention provides a process for the preparation of polymeric ketenes having a polyester structure which comprises polymerizing a ketene having the general formula $R_2C=C=O$ in which R represents an organic radical and/or hydrogen in the presence of a palladium catalyst.

Ketene polymers having a polyester structure have been prepared and described by Furukawa et al. in Die Makromolekulare Chemie, 39, 243 (1960). According to this article, diketene was polymerized in the presence of $HgCl_2$ giving a 40% yield of polyketene. Natta et al. have also obtained low yields of copolymers of the polyester type from dimethyl ketene. In Die Makromolekulare Chemie, 44–46, 537 (1961), Natta et al. prepare polyester type polymers of dimethyl ketene using organometallic compounds such as triethyl aluminum.

According to the Furukawa process a diketene must be used which must be first prepared from monomeric ketene. The yields of both the Furukawa method and the Natta method are very low.

It has now been unexpectedly discovered that monomeric ketenes may be polymerized to polyesters in a generally quantitative yield by the use of a palladium catalyst.

It is therefore the primary object of the present invention to prepare polymeric ketenes having a polyester structure. It is another object of the present invention to polymerize monomeric ketenes to polymeric ketenes in high quantitative yields. Other objects will become apparent to one skilled in the art from the following disclosure.

These and other objects may be accomplished by the process of the instant invention which comprises polymerizing a ketene having the general formula $R_2C=C=O$ in which R represents an organic radical and/or hydrogen in the presence of a palladium catalyst.

In the process of the present invention, ketene is the preferable starting material and may be prepared by any suitable method, such as, for example, by the pyrolysis of acetone. Other ketenes are, however, suitable for use in the present invention and include those monomeric ketoketenes (disubstituted ketenes) represented by the general formula $R_2C=C=O$ in which R is an organic group and/or hydrogen. The R is preferably a hydrocarbon radical which may be aliphatic, cycloaliphatic, heterocyclic or aromatic and includes, among others, the alkyl, cycloalkyl, alkenyl, cycloalkenyl, aryl, alkaryl and aralkyl radicals. Suitable ketenes include ketene, dimethylketene, diethylketene, methylethylketene, dipropylketene, phenol ketene, diphenyl ketene, methyl phenyl ketene, ethyl phenyl ketene, propyl phenyl ketene and isopropyl phenyl ketene.

The kekoketenes suitable for use in the present process may be prepared by any of the generally known methods such as, for example, by the pyrolysis of the respective ketene or alcohols or from the alpha-halogen acyl halides by the action of zinc.

As noted above, the present process provides a method for preparing polyketenes in a simple manner in high yields from a monomeric ketene. On the other hand, according to the Furukawa process, diketene, which must first be prepared from monomeric ketene, has to be used as the starting material.

The palladium catalyst may be present in various forms, as, for example, in suspended or dissolved form. The palladium is preferably present in the catalyst in the second oxidation stage. A palladium chloride ($PdCl_2$) catalyst suspended in organic solvents has been found to be particularly advantageous. It is also possible to use complex catalysts, such as complexes of palladium chloride with organic compounds such as benzonitrile, giving $(C_6H_5CN)_2 \cdot PdCl_2$; and with ethylene, giving $(C_2H_4 \cdot PdCl_2)_2$, and with propylene, giving $(C_3H_6 \cdot PdCl_2)_2$. Complexes having the formula $(Ar_3X)_2 \cdot PdCl_2$, in which Ar represents an aryl group, and in particular, a phenyl group, and X is phosphorus, antimony or, preferably, arsenic, are preferred. The use of such complexes permits the preparation of practically colorless ketene polymers in an unexpectedly good yield.

Complexes of this type may generally be prepared by boiling a suspension of $PdCl_2$, for example, in toluene, under reflux with the complex-former, such as, for example, triphenyl arsine or triphenyl phosphine, until the palladium chloride has dissolved. The reaction mixture will, it is true, decompose with metallic antimony and palladium precipitating, if an attempt is made to prepare the triphenyl stibine complex under identical conditions. Such complexes may, however, be prepared by converting $PdCl_2$-benzonitrile complexes with triphenyl stibine, preferably at room temperature, according to equation:

$(C_6H_5CN)_2 \cdot PdCl_2 + 2(C_6H_5)_3Sb$

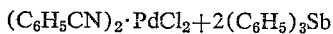

In general, the amount of catalyst may vary within wide limits; however, 0.05% to 5% by weight of the ketene was found to be very suitable with from 0.1% to 2% being especially preferred.

The polymerization may be effectively carried out in the liquid phase by bringing the ketene into contact with the catalyst dissolved or dispersed in a solvent. The solvents used may be aromatics such as benzene, toluene or xylene; ketones such as acetone or methyl ethyl ketone; or ethers such as diethyl ether and dimethoxy ethane. Aromatics are preferably used. During polymerization the temperature of the reaction mixture generally rises considerably, so that it is desirable to cool to temperatures of from about 10° C. to 50° C.

The polymers prepared according to the invention are generally solids having molecular weights of up to about 2,000 and melting ranges of, for example, 80° C. to 140° C. The polyketene prepared from ketene is a stable form of diketene which is easy to store and safe to handle and which may be used advantageously instead of diketene and acetoacetic ester for syntheses, for example, of pyrazolones and the like. By fractionation with solvents, such as acetone, it is generally possible to obtain a soluble, low-melting fraction, and in addition an insoluble, higher-melting fraction. By reason of its highly unsaturated nature it further offers numerous possibilities for use as a starting compound for the known reactions on C=C double bonds, e.g., by hydrogenation to poly-beta-hydroxybutyric acid. The diketenes may also be advantageously used to prepare aceto-acetates, acetoacetanilide, and dehydracetic acid.

The polyketene prepared from ketene is very difficult to dissolve in aliphatic, cyclo-aliphatic and aromatic hydrocarbons, alcohols and water, and can only be partly dissolved in dioxane, acetone and chloroform. The most suitable solvent is acetic ester with only a small residue remaining when heated.

The invention is illustrated by the following examples. Any of the ketoketenes discussed above are suitable; however, because ketene is easily produced, this monomer is particularly exemplified in the examples. Otherwise, the catalysts, proportions and specific conditions are presented as being typical and various modifications can be made in view of the disclosure without departing from the spirit or scope of the disclosure or of the claims. Unless otherwise specified, parts and percentages are by weight.

*Example I*

Gaseous ketene was passed into a solution of the catalyst in toluene at room temperature and atmospheric pressure. The catalyst consisted of a palladium chloride/ benzonitrile complex, $(C_6H_5CN)_2 \cdot PdCl_2$. The ketene was thereby quantitatively converted into a resinous, brownish polymer with only traces of diketene being formed.

*Example II*

When an ethylene/palladium chloride complex, $$(C_2H_4 \cdot PdCl_2)_2$$

which was partly suspended and partly dissolved in benzene was used as catalyst under otherwise identical conditions as in Example I, the ketene was again almost quantitatively converted into a resinous polymer with only small amounts of diketene and dehydracetic acid being formed.

*Example III*

Fourteen mg. of a triphenyl phosphine/palladium chloride complex, $[(C_6H_5)_3P]_2 \cdot PdCl_2$, were dissolved in 50 ml. of toluene. 30 g. of ketene was subsequently introduced with stirring. Care was taken to allow the drops of ketone formed on a superimposed Dry-Ice cooler to drop directly into the catalyst solution. The heat of reaction was removed by water cooling (10° C.–50° C.). After several hours all the ketene had been used up. The powdery polymer was removed by suction, washed with toluene and dried. The yield was 26 g. (87% of theory) of polymeric ketene having a melting point of 85° C.–90° C.

*Example IV*

Fifteen mg. of the complex $[(C_6H_5)_3As]_2 \cdot PdCl_2$ were dissolved in 50 ml. of toluene, 16 g. of ketene being subsequently introduced as above. The yield was 15 g. of a pale-yellow crude product having a melting point of 86° C.–91° C. (94% of theory). Of the polymeric product thus formed, 70% was soluble in acetone and 30% was insoluble therein. The acetone-soluble portion had a melting point of 75° C.–80° C. and the acetone-insoluble portion had a melting point of approximately 140° C.

*Example V*

Fifteen mg. of the complex $[(C_6H_5)_3Sb]_2 \cdot PdCl_2$ prepared from $(C_6H_5CN)_2 \cdot PdCl_2$ and $2(C_6H_5)_3Sb$ was dissolved in 50 ml. of toluene. Thereupon 10 g. of ketene was introduced with stirring. 9.8 g. of crude polyester (98.0% of theory) having a melting point of 86°–89° C. was obtained.

*Example VI*

This example illustrates the advantages of the present process as well as the polyester structure of the polyketenes.

One g. of $PdCl_2$ was suspended in 500 ml. of benzene and approximately 70 g. of ketene were introduced as gas with vigorous stirring. A gross yield of 60 g. of polyketene (86.5% of theory) having a melting point of 93° C.–95.5° C. was obtained.

For comparison, diketene was added to a suspension of $PdCl_2$ in toluene. Hardly any polymerization occurred. Further, the monomeric ketene did not polymerize to any extent in the presence of $HgCl_2$.

In order to establish the structure of the present polymers, UV and IR spectra were taken. The UV spectrum of the polymer showed a maximum at 226 m$\mu$ and the hydrogenation product of the polymer a maximum at 223 m$\mu$. A conjugation of C=O and C=C double bonds is therefore impossible. The IR spectrum showed distinct bands at 1670 and 3110 cm.$^{-1}$, indicating a vinyl group. There was also a distinct band at 1740 and 1760 cm.$^{-1}$, indicating an ester grouping in the molecule. In addition, the following experiments were carried out to establish the structure:

(a) 10 g. of the polymer prepared as in Example VI were dissolved in 100 ml. of dioxane and hydrogenated over a Raney nickel catalyst at 50° and 100 atm. $H_2$. One mol of hydrogen was taken up per two ketene units in the polymer.

(b) The solvent and 0.6 g. of n-butyric acid were removed from the hydrogenation product by distillation. Approximately 9 g. of oily poly-beta-hydroxy butyric acid remained, which yielded a mixture of beta-hydroxy butyric acid and crotonic acid upon saponification with alcoholic caustic potash solution.

(c) The polymeric ketene could be reduced to 1,3-butane diol with lithium-aluminum hydride.

(d) 4.2 g. of the polymer prepared as in Example VI were mixed with 30 ml. of dioxane. Five g. of anhydrous hydrazine were added dropwise with stirring and cooling with water. The mixture was subsequently heated at 90° C. for 5 hours with excess hydrazine and dioxane removed in vacuo. The crystalline evaporation residue was recrystallized from water. Yield: 4.6 g. (94% of theory) of 3-methylpyrazolone-(5). The melting point and mixed melting point was 217° C.–220° C.

On the basis of these spectra and conversions as well as the identity of the infrared spectra of the polymers prepared according to the instant process of the invention, the polyester structure of the polymer may be considered established.

*Example VII*

Substantially the same higher yields are obtained when the ketoketene is either diphenyl ketene or dimethyl ketene.

We claim as our invention:

1. A process for preparing polyketenes having a polyester structure

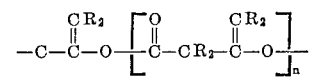

wherein R is selected from the group consisting of organic radicals and hydrogen and $n$ is a positive integer, which comprises polymerizing at from 10° to 50° C. a ketoketene having the general formula $R_2C=C=O$ wherein R is selected from the group consisting of a phenyl group, an alkyl group having from 1 to 4 carbon atoms and hydrogen in the presence of from 0.05% to 5% by weight of the ketoketene of a palladium catalyst selected from the group consisting of $PdCl_2$ and complexes having the general formula $(Ar_3X)_2 \cdot PdCl_2$ wherein Ar is phenyl and X is selected from the group consisting of phosphorus, antimony and arsenic.

2. A process as in claim 1 wherein the ketoketene is ketene.

3. A process as in claim 1 wherein the palladium catalyst is $PdCl_2$.

4. A process as in claim 1 wherein X is arsenic.

5. A process as in claim 1 wherein the palladium catalyst is $[(C_6H_5)_3P]_2 \cdot PdCl_2$.

References Cited by the Examiner

FOREIGN PATENTS 893,308  4/1962  Great Britain.

OTHER REFERENCES

Handbook of Chemistry and Physics, 42nd ed., p. 423.

WILLIAM H. SHORT, *Primary Examiner.*

C. A. WENDELL, *Assistant Examiner.*